J. KLAER.
Buckwheat-Scouring Machines.
No. 154,144. Patented Aug. 18, 1874.
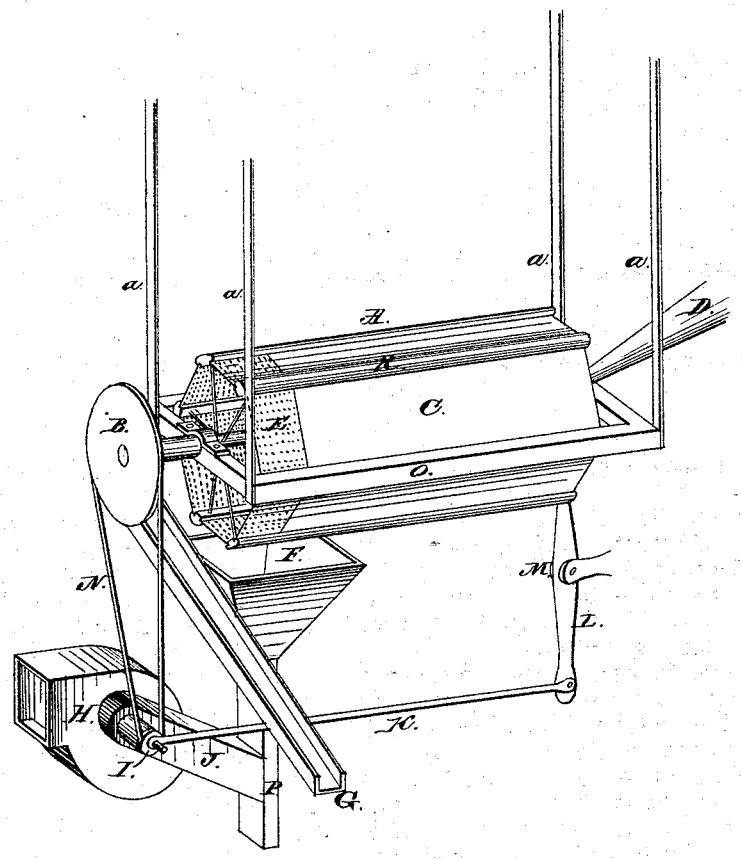

UNITED STATES PATENT OFFICE.

JOHN KLAER, OF MILFORD, PENNSYLVANIA.

IMPROVEMENT IN BUCKWHEAT-SCOURING MACHINES.

Specification forming part of Letters Patent No. 154,144, dated August 18, 1874; application filed February 21, 1874.

*To all whom it may concern:*

Be it known that I, JOHN KLAER, of Milford, Pike county, State of Pennsylvania, have invented a Buckwheat-Scouring Machine, of which the following is a specification:

The object of my invention is to scour buckwheat with emery or its equivalent by the combination of a shaking bolting-reel, A, having its bearings in the frame O, which is suspended by steel springs $a\ a\ a\ a$ and shaken endwise by the lever L on fulcrum M, and worked by rod K, receiving its motion from crank J on end of fan-shaft I. The reel is turned by band N passing around fan-shaft I and over pulley B. The sides C of the reel A slide out of grooves in the ribs R, and are covered with emery on the inside. The grain enters the reel through spout D, is scoured by the emery on the sides C, and separated from the tailings through screen E into hopper F, and passes down through tube P, where it is cleansed by a blast from fan H. The tailings are carried off by trough G.

It will be evident that quartz-sand or ground glass, or flint, can be used in lieu of emery, and that the polishing material can be applied with glue, copal varnish, or cement, and that all other kinds of grain can be scoured and cleaned by this machine.

I claim as my invention—

The combination, in a shaking revolving reel, A, of the sides C, coated with emery or its equivalent, and the screen E, as and for the purpose specified.

JOHN KLAER.

Witnesses:
 JOHN M. YOUNG,
 CORNELIUS W. BULL.